(12) United States Patent
Gagliano

(10) Patent No.: US 8,579,309 B1
(45) Date of Patent: Nov. 12, 2013

(54) VEHICLE FRAME MOUNTING

(75) Inventor: Charles J. Gagliano, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/586,512

(22) Filed: Aug. 15, 2012

(51) Int. Cl.
*B62D 24/00* (2006.01)

(52) U.S. Cl.
USPC .............. 280/124.109; 180/312; 280/785

(58) Field of Classification Search
USPC .......... 280/124.109, 781, 785; 296/193.01, 296/193.07; 403/202, 203, 220–228; 180/312
See application file for complete search history.

(56) References Cited

U.S. PATENT DOCUMENTS

| | | | |
|---|---|---|---|
| 3,481,622 A | 12/1969 | Van Winsen et al. | |
| 4,531,761 A * | 7/1985 | von Sivers | 280/785 |
| 5,362,091 A * | 11/1994 | Lee | 280/124.109 |
| 6,003,897 A | 12/1999 | Dostert et al. | |
| 6,435,584 B1 | 8/2002 | Bonnville | |
| 7,111,705 B2 | 9/2006 | Ohta et al. | |
| 7,393,016 B2 * | 7/2008 | Mitsui et al. | 280/784 |
| 7,445,243 B2 | 11/2008 | Park | |
| 2010/0102595 A1 | 4/2010 | Baumbarger | |

* cited by examiner

*Primary Examiner* — Joseph Rocca
*Assistant Examiner* — Robert A Coker
(74) *Attorney, Agent, or Firm* — Rankin, Hill & Clark LLP

(57) ABSTRACT

A vehicle frame assembly includes a structural member configured to support a vehicle body and a subframe member configured to support at least one of a vehicle suspension and an engine. The structural member includes a cavity and the subframe member includes a support section and an extension that extends transversely from the support section. The extension is received in the cavity to connect the subframe member with the structural member.

19 Claims, 3 Drawing Sheets

VEHICLE FRAME MOUNTING

BACKGROUND

Exemplary embodiments herein relate to a mounting structure, and more particularly to frame mounting structures for vehicles.

As new vehicles are being developed, there is an increased desire to improve their fuel efficiency. One way to accomplish this goal is to reduce the overall weight of the vehicle. As the curb weight of the vehicle is largely comprised of the frame mounting structure, there are numerous opportunities to reduce the curb weight by improving the frame structure. However, these improvements to the frame assembly should not adversely affect the handling or performance of the vehicle.

A conventional vehicle frame assembly is shown in FIG. 1. The vehicle frame assembly 10 includes a frame member 12 that supports a vehicle body and a subframe 16 that could support a vehicle engine, transmission, or suspension component. The frame member 12 and the subframe 16 are joined together by placing the subframe 16 between the frame member 12 and a bolt stay 26. A first fastener 18 extends through the bolt stay 26, the subframe 16, and into the frame member 12. The first fastener 18 provides attachment between the frame member 12 and the subframe 16.

Further, a bushing 20 is coaxially disposed on the first fastener 18 with an upper bushing stopper 22 and a lower bushing stopper 24 surrounding the bushing 20. A second fastener 28 attaches the bolt stay 26 to the frame member 12. Finally, the frame member 12 defines a neutral axis 14. The neutral axis 14 is an axis in which there are no longitudinal stresses or strains. The greater the distance between the neutral axis and the attachment point of the subframe to the structural member, the larger the moment arm will be. It is desirable to minimize the length L between the neutral axis 14 and the subframe 16. By minimizing the distance L, handling of the vehicle can be better controlled.

Because of the layout of the traditional frame assembly 10, the bushing stoppers 22, 24 are positioned horizontally. Thus, the bushing stoppers 22, 24 are preloaded by the vehicle weight, thereby degrading vehicle handling. Further, the bolt stay 26 of the frame assembly 10 is used for stiffness purposes. The presence of the bolt stay 26 contributes to the curb weight. Additionally, because of the positioning of the bolt stay 26, it is only effective in one direction. Specifically, the bolt stay 26 is only effective in either the lateral or longitudinal direction. Thus, the handling of a vehicle with the traditional frame assembly 10 suffers.

BRIEF DESCRIPTION

According to one aspect, a vehicle frame assembly includes a structural member and a subframe member. The structural member is configured to support a vehicle body and the structural member includes a cavity. The subframe member is configured to support at least one of a vehicle's suspension and engine. The subframe member includes a support section and an extension. The extension extends transversely from the support section. Furthermore, the extension is received in the cavity to connect the subframe member with the structural member.

According to another aspect, the vehicle frame assembly includes a structural member, a subframe member, and a fastener. The structural member includes a socket that defines a generally vertical central axis and the structural member defines a neutral axis. The subframe member is configured to support at least one of a vehicle's suspension and engine. The subframe member vertically extends at least partially into the socket. The fastener is generally horizontally oriented and defines a horizontal central axis. The fastener locks the structural member to the subframe member. A moment arm between the neutral axis and the horizontal central axis is located within the socket.

According to still another aspect, a vehicle frame assembly includes a structural member, a subframe member, and first and second bushing stoppers. The structural member supports a vehicle body on a first side and includes a socket on a side that is different from the first side. The socket defines an inner diameter and an outer diameter. The subframe member includes a first portion and a second portion. The first portion is received within the socket of the frame member such that a perimeter of the first portion is at least partially encircled by the socket. The second portion extends in a generally transverse direction from the first portion. The first and second bushing stoppers are generally vertically oriented between the first portion of the subframe member and the socket of the structural member so as to not carry the weight of the vehicle body. An inner surface of each of the first and second bushing stoppers faces toward the first portion and an outer surface of each of the first and second bushing stoppers faces toward the socket. The outer surface of the first and second bushing stoppers and the inner diameter of the socket define a gap.

DETAILED DESCRIPTION

Figure 2:
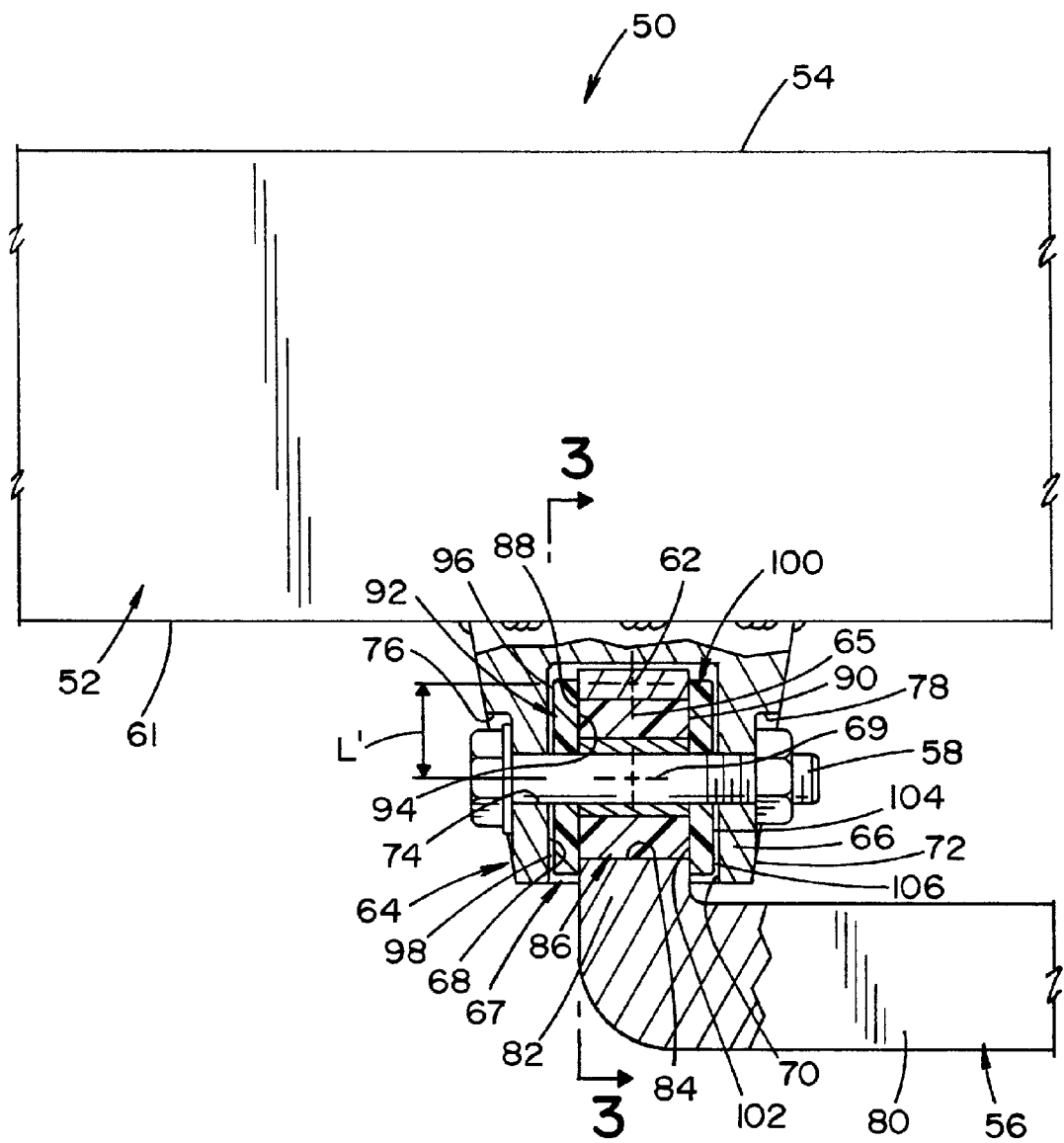
FIG. 2 is a sectional view of a vehicle frame assembly of the present application.
Figure 3:
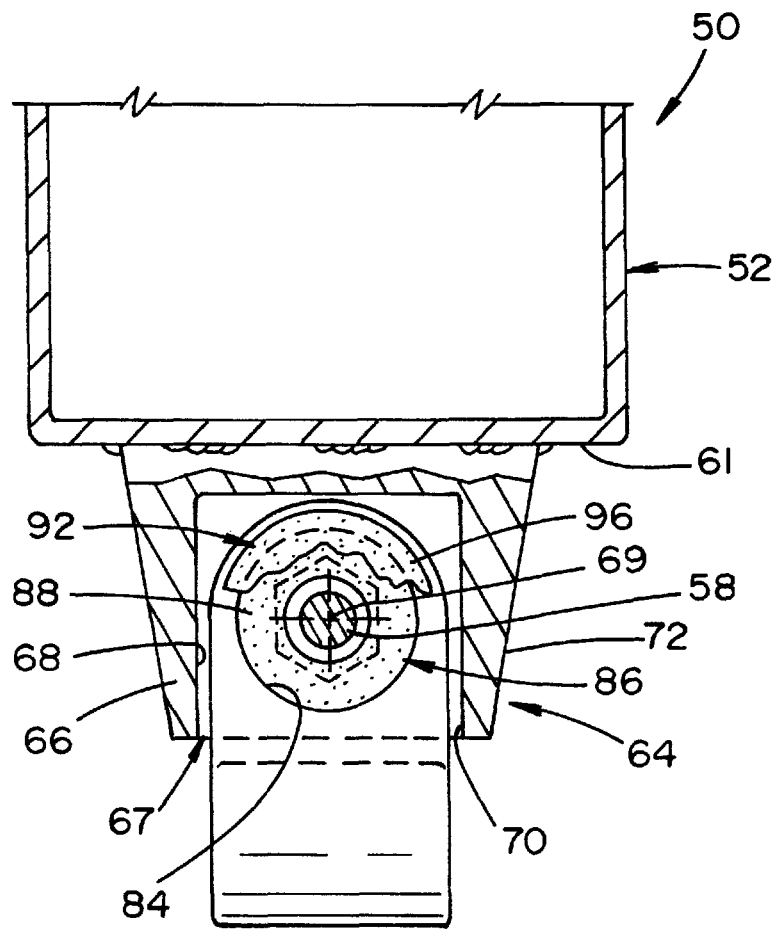
FIG. 3 is a sectional view taken along lines 3-3 of FIG. 2.

Referring now to the drawings, wherein they are for purposes of illustrating one or more exemplary embodiments and not for purposes of limiting same, FIGS. 2-3 illustrate a vehicle frame assembly 50 of the present application.

It should, of course, be understood that the descriptions and drawings herein are merely illustrative and that various modifications and changes can be made in the structures disclosed without departing from the present disclosure. It will also be appreciated that various identified components of the vehicle frame assembly disclosed herein are merely terms of art and may vary from one vehicle manufacturer to another and should not be deemed to limit the present disclosure. All references to direction and position, unless otherwise indicated, refer to the orientation of the vehicle frame assembly illustrated in the drawings and should not be construed as limiting the claims appended hereto. Like numerals refer to like parts throughout the several views.

The vehicle frame assembly 50 includes a structural member 52 with a first side 54 that can support a vehicle body. The frame assembly 50 also includes a subframe member 56 that can support a vehicle engine, transmission, or suspension component, etc. The frame assembly 50 also defines a neutral axis 62. The neutral axis 62 is an axis where there are no longitudinal stresses or strains. Further, a fastener 58 connects the subframe member 56 to the structural member 52. Unless otherwise noted, the components of the vehicle frame assembly 50 can be made from any number of materials including metallic and polymeric compounds, as long as the materials have sufficient rigidity to function as a vehicle frame assembly.

As shown in FIG. 2 and FIG. 3, the structural member 52 includes the first side 54. The first side 54 can support a vehicle body, as it is known in the art. On a side 61 of the structural member 52 that is different than the first side 54, a cavity or socket 64, extends. The first side 54 is depicted as an upper side and the other side 61 is depicted as a lower side; however, the first side could be adjacent the other side. The structural member 52 may have a circular, oblong or rectangular cross-section. Further, the structural member 52 may be hollow or solid. The structural member 52 provides structural stability to the vehicle, as is known by one skilled in the art.

The socket 64 defines a generally vertical central axis 65 and receives the subframe 56. The socket 64 further defines a cavity 67. The cavity 67 is coaxially aligned with the vertical central axis 65. The socket 64 also includes a sidewall 66 that vertically extends toward a support section 80 of the subframe 56, as will be described hereinafter. The sidewall 66 defines an inner diameter 68 and an outer diameter 72 and can have a generally cylindrical shape. Further, the sidewall 66 includes an inner wall surface 70 that faces toward the support section 80 as will also be explained below. The outer diameter 72 may vary as the socket 64 extends toward the subframe 56. Further, the socket 64 may be recessed within structural member 52 so there is no outward extension of the socket 64, or the socket 64 may extend outwardly (downwardly in FIG. 2).

The socket 64 further includes a socket bore or passage 74 that transversely extends through the sidewall 66 in a first or horizontal direction, as will be described below. The sidewall 66 further defines a first counter bore 76 and a second counter bore 78 for receipt of the fastener 58 for locking the subframe 56 to the structural member 52. As illustrated, a head of the fastener 58 is near the first counter bore 76 and a thread end of the fastener 58 is near the second counter bore 78. However, other orientations are possible and contemplated. With the present vehicle frame assembly 50, the bolt stay 26 (FIG. 1) can be eliminated, thereby reducing the curb weight.

With continued reference to FIGS. 2-3, the subframe 56 includes the support section or second portion 80, that extends in the horizontal or first direction and the extension or first portion 82, that extends in a generally vertical or second direction. The extension 82 and the support section 80 can extend in generally transverse directions from one another. Specifically, the extension 82 and the support section 80 can extend from one another in a perpendicular direction. The subframe 56 may be hollow or solid and may have a circular, oblong, or rectangular cross-section. As is known in the art, the subframe 56 can be used to attach the vehicle engine, transmission, or suspension component to the structural member 52 of the frame assembly 50. A cross-sectional circumference of the subframe 56 may be less than a cross-sectional circumference of the structural member 52.

The extension 82 of the subframe 56 can have a shape that is complementary to the inner diameter 68, and specifically, the inner wall surface 70 of the socket 64 of the structural member 52. The extension 82 can further define a passage or bore 84 that receives the fastener 58 and bushing 86. The extension 82 is received in the socket 64 to connect the subframe 56 with the structural member 52. The extension 82 extends in a second or vertical direction, where the second direction is transverse to the first direction. Further, the second direction can be generally perpendicular to the first direction. Further, the extension 82 can be least partially circumferentially surrounded by the socket 64. Further, the extension bore 84 extends in the first direction.

Because the extension 82 of the subframe 56 extends within the socket 64 of the structural member 52 and the subframe 56 attaches to the structural member 52 as shown, numerous benefits are realized. For example, a bolt stay is not needed. Further, frame rigidity is improved in both the lateral and the longitudinal directions. Also, the moment arm can be located within the socket 64 and is collinear with the central vertical axis 65 that is defined by the socket 64. This advantage will be discussed in more detail below. It is noted that these improvements not only reduce curb weight, but also improve vehicle handling.

Figure 1:
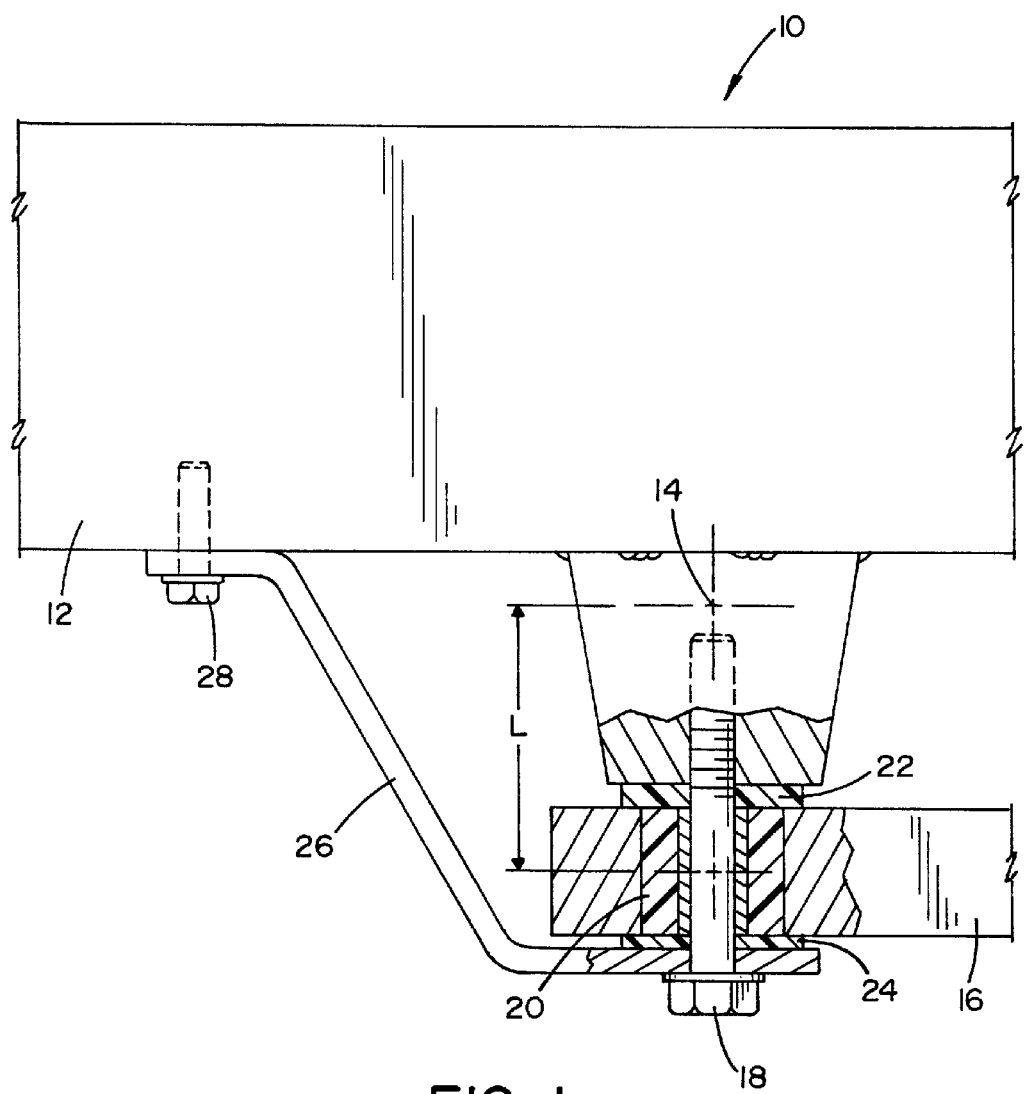
FIG. 1 is a sectional view of a traditional vehicle frame assembly.

Further still, the distance L' between the neutral axis 62 and a horizontal central axis 69 that is defined by the fastener 58 is reduced, as compared to the traditional frame assembly 10, shown in FIG. 1. Typically, the distance L' of the assembly 50 is less than ½ of the distance L of the assembly 10 (FIG. 1). More particularly, distance L' of the assembly 50 is about ⅓ of the distance L of the assembly 10. By reducing the distance L, forces applied to the frame assembly 50 result in smaller moments. As such, the stress and strain in the assembly 50 is reduced. Accordingly, dimensionally smaller components may be utilized in the assembly 50 while still maintaining adequate performance. This results in a vehicle with a lower curb weight and that is more economical to manufacture.

The vehicle frame assembly 50 can also include a bushing 86. The bushing 86 has a first end 88 and a second end 90. Further, the bushing 86 surrounds the fastener 58 and is coaxially aligned with the horizontal central axis 69. The bushing 86 extends in the socket 64 along the first direction and in a generally parallel direction to the support section 80. The bushing 86 may be constructed of one single material or a combination of materials. These materials may include any number of materials including various rubber and polymeric compounds as is known in the art for absorbing vibration.

First and second bushing stoppers 92, 100 can be disposed between the subframe member 56 and the sidewall 66 of the structural member 52. The first bushing stopper 92 contacts the first end 88 of the bushing 86 and the first bushing stopper 92 is generally horizontally oriented so as to not carry the weight of the vehicle body. Further, the first bushing stopper 92 is offset transversely from the internal wall surface 70 of the socket 64. The first bushing stopper 92 includes an inner surface 94 that faces toward the first portion or extension 82 of the subframe 56 and an outer surface 96 that faces toward the socket 64. The inner surface 94 cooperates with the outer surface 96 to define a gap 98.

The second bushing stopper 100 contacts the second end 90 of the bushing 86. The second bushing stopper 100 is generally horizontally oriented so as to also not carry the weight of the vehicle body. Further, the second bushing stopper 100 is offset transversely from the internal wall surface 70 of the socket 64. The second bushing stopper 100 includes an inner surface 102 that faces toward the extension 82 and an outer surface 104 that faces toward the socket 64. The inner surface 102 and the outer surface 104 cooperate to define a gap 106. The first and second bushing stoppers 92, 102 are equidistantly distance spaced apart from the generally vertical central axis 65.

As described hereinbefore, the gap 98, 106 is desirable to improve handling for the vehicle. Specifically, the gap 98, 106 reduces vibration transmission when the vehicle is being driven straight. Further, when the vehicle is turned, the gap 98, 106 is closed so that the stiffness of the frame assembly 50 is increased. This feature allows an improvement in vibration and noise isolation without degrading handling performance. In some vehicle applications, this type of response is highly desirable. Although the frame assembly 50 is illustrated as having two gaps 98, 106, it is understood that this is not required. Rather, having only one gap, will still provide improved vehicle handling.

It will be appreciated that the above-disclosed and other features and functions, or alternatives or varieties thereof, may be desirably combined into many other different systems or applications. Also, presently unforeseen or unanticipated alternatives, modifications, variations or improvements therein may be subsequently made by those skilled in the art which are also intended to be encompassed by the following claims.

The invention claimed is:

1. A vehicle frame assembly, comprising:
   a structural member configured to support a vehicle body, the structural member including a cavity;
   a subframe member configured to support at least one of a vehicle suspension and an engine, the subframe member including a support section and an extension extending transversely from the support section, wherein the extension is received in the cavity to connect the subframe member with the structural member, wherein at least a portion of the subframe member extending within the cavity of the structural member has a shape complementary to the cavity.

2. The assembly of claim 1, further comprising:
   a fastener connecting the structural member to the subframe member, the fastener being generally horizontally oriented and defining a central axis; and
   a bushing surrounding the fastener and coaxially aligned with the central axis,
   wherein the extension includes a passage coaxial with the central axis, and wherein the fastener and the bushing are received in the passage.

3. The assembly of claim 2, further comprising a first bushing stopper contacting a first end of the bushing and a second bushing stopper contacting a second end of the bushing, wherein each bushing stopper is generally vertically oriented.

4. The assembly of claim 3, wherein the cavity is defined by an internal wall surface and the first bushing stopper is offset transversely from the internal wall surface.

5. The assembly of claim 4, wherein the second bushing stopper is offset from the internal wall surface.

6. The assembly of claim 2, wherein the cavity defines a generally vertical central axis and the first bushing and the second bushing are equidistantly spaced from the generally vertical central axis.

7. The assembly of claim 2, wherein the structural member defines a neutral axis and the neutral axis is an axis in which there are no longitudinal stresses or strains, and wherein the fastener is disposed so that a distance between the neutral axis and the central axis is less than a vertical height of the cavity.

8. The assembly of claim 1, wherein the cavity extends from a side of the structural member that is different than a side of the structural member that supports the vehicle body.

9. A vehicle frame assembly, comprising:
   a structural member including a socket defining a generally vertical central axis, the structural member defining a neutral axis, wherein the neutral axis is an axis in which there are no longitudinal stresses or strains;
   a subframe member configured to support at least one of a vehicle suspension and an engine, the subframe member vertically extending at least partially into the socket; and
   a fastener being generally horizontally oriented and defining a horizontal central axis, the fastener locking the structural member to the subframe member, wherein the fastener is disposed so that a distance between the neutral axis and the horizontal central axis is less than a vertical height of the socket.

10. The assembly of claim 9, wherein the generally vertical central axis is collinear with the moment arm.

11. The assembly of claim 9, wherein the subframe member further comprises a support section extending in a first direction and an extension extending in a second direction within the structural member to be at least partially circumferentially surrounded by the socket of the structural member, wherein the first direction and the second direction are generally transverse.

12. The assembly of claim 11, wherein the socket is defined by a sidewall vertically extending toward the support section of the subframe member in a direction generally parallel to the second direction.

13. The assembly of claim 12, wherein the socket further defines a socket bore transversely extending through the sidewall in a direction generally parallel to the first direction.

14. The assembly of claim 13, wherein the extension of the subframe member defines a bore extending through the extension in a direction generally parallel to the first direction.

15. The assembly of claim 12, wherein the sidewall has a generally cylindrical shape.

16. The assembly of claim 11, further comprising:
   a bushing extending in the socket along the first direction so as to be generally parallel to the support section.

17. The assembly of claim 9, wherein at least a portion of the subframe member that extends within the socket of the structural member has a shape complementary to the socket.

18. A vehicle frame assembly, comprising:
   a structural member supporting a vehicle body on a first side and including a socket on a side that is different from the first side, wherein the socket defines an inner diameter and an outer diameter;
   a subframe member including a first portion and a second portion, wherein the first portion is received within the socket of the structural member such that a perimeter of the first portion is at least partially encircled by the socket and the second portion extends in a generally transverse direction from the first portion; and
   first and second bushing stoppers generally vertically oriented between the first portion of the subframe member and the socket of the structural member so as to not carry a weight of the vehicle body, an inner surface of each of the first and second bushing stoppers facing toward the first portion and an outer surface of each of the first and second bushing stoppers facing toward the socket, wherein the outer surface of the first and second bushing stoppers and the inner diameter of the socket define a gap.

19. The vehicle frame assembly of claim 18, wherein the inner surface of each of the first and second bushing stoppers contacts the first portion of the subframe member and the outer surface of each of the first and second bushing stoppers is free from contact with the inner diameter of the socket.

* * * * *